United States Patent [19]

Carmouche

[11] Patent Number: 5,058,833
[45] Date of Patent: Oct. 22, 1991

[54] SPACESHIP TO HARNESS RADIATIONS IN INTERSTELLAR FLIGHTS

[76] Inventor: William J. Carmouche, 353 Stanford Ave., Baton Rouge, La. 70808

[21] Appl. No.: 489,349

[22] Filed: Mar. 6, 1990

[51] Int. Cl.⁵ ............................................. B64G 1/40
[52] U.S. Cl. .................................. 244/158 R; 244/172
[58] Field of Search ............. 244/158 R, 158 A, 159, 244/54, 160, 162, 172, 2, 173

[56] References Cited

U.S. PATENT DOCUMENTS

| 3,818,700 | 6/1974 | Kratrowitz et al. | 244/172 |
| 3,868,072 | 2/1975 | Fogarty | 244/172 |
| 4,557,444 | 12/1985 | Jackson et al. | 244/172 |
| 4,614,319 | 9/1986 | Drexler | 244/172 |

Primary Examiner—Sherman Basinger
Assistant Examiner—Stephen P. Avila
Attorney, Agent, or Firm—William David Kiesel; Robert C. Tucker; Timothy J. Monahan

[57] ABSTRACT

A spaceship is provided with a freely spinning propeller mounted on the front end. The propeller significantly reduces resistance to flight and also deflects space particles which might otherwise slow the craft. The sides of the spacecraft have ridges which are coated on the front side with radiation reflecting material and on the back side with radiation absorbing material. The resultant force of radiations being absorbed from the rear and reflected from the front propels the spacecraft forward.

12 Claims, 3 Drawing Sheets

SPACESHIP TO HARNESS RADIATIONS IN INTERSTELLAR FLIGHTS

BACKGROUND OF THE INVENTION

1. Field of the Invention

This invention relates generally to ships for space travel and particularly to propulsions systems for such ships which are able to harness the radiations in space and minimize the resistance caused by various space particles which impact upon the front of the ship.

2. Prior Art

The prevailing opinion among scientists is that our nearest star, Proxima, is about twenty-five trillion miles away. However, this is challenged by many who contend that the methods used to calibrate this distance are not conclusive. The actual distance is estimated to be between twenty-five trillion and twenty-five billion miles. The solar wind, which is far more tangible than light, has an estimated velocity of 300 miles per second. If Proxima were proven to be twenty-five billion miles instead of twenty-five trillion then it would take only twenty-six years to reach there instead of two thousand and six hundred years sailing with the velocity of the solar wind. There are numerous reasons to be skeptical about the true distances to our neighboring stars. Their distances are frequently calculated on the basis of the velocity of light. Hubbles law regarding the velocity of the expanding Universe is said to be too circumstantial to serve as a guide for measuring such distances The Doppler effect of the red shift is used in conjunction with the wave length and the assumed velocity of light to determine stellar distances. This criterion for deciding the distances of stars is by no means absolute, and cannot be relied upon to convince us positively that Proxima is 4.3 light years away.

Variations in the densities of different regions of space can adversely affect the accuracy of measurements of stellar distances.

Scientists are confused about the meaning of the velocity of light because they are not certain whether they are measuring the velocity of individual photon, or whether they are measuring the time lapse between the impact against the first photon of many contiguous photons within a ray of photons, and the reverberation of the last photon at the end of the ray as it excites the retina of the observer. It is difficult to distinguish between the velocity of a photon and the velocity of a repercussion through a row of contiguous photons.

We can be assured that if Proxima is twenty-five billion miles away instead of twenty-five trillion our hopes of colonizing the planets surrounding it would be far more realistic.

Further doubt can be cast upon the accuracy of stellar distances which are measured by reliance upon perceptible parallaxes. As light from a star passes by a large celestial body on its way to the observer on earth, its line of flight is bent away. This will have an enormous effect on calculating the distance of that star. The true distance of that star could be distorted by as much as a thousand times.

A number of ambitious ideas have been researched in an attempt to solve the problems inherent in our hopes to travel to the planets of our nearest stars. None of them are considered feasible at this time, because of the restrictions imposed by the elements of time, distances, fuel, velocities and storage space. The most significant systems are listed below.

First: The Fuel Jet Propulsion System. It is considered futile to even contemplate the likelihood that the most sophisticated of our latest plans and designs could overcome the obstacles.

Second: Mirror Matter Annihilation Propulsion System. One of the most intriguing machines proposed for development in programs for interstellar travel is based upon the costly production of antimatter by bombarding atoms in accelerators which generate an enormous amount of heat and energy. Official reports indicate that the efficiency is fantastic. Unfortunately, however, it would be necessary to carry along an excessive amount of reacting materials to operate the jets. The government has invested heavily in producing this super charged material which is difficult to store, but it is not enthusiastic about its potential. However, the system has been recommended highly by theoretical scientists and by recipients of the Nobel Award. This substance is reputed to be more than a thousand times as powerful as nuclear fission, but it seems that it would bankrupt the world to attempt to procure the amount needed to reach the stars.

Third: Controlled Nuclear Propulsion. A tremendous amount of financing by government agencies has been appropriated for various engineering experimentations to control the fusion of hydrogen and helium atoms to generate the heat to activate jet particles for acceleration for spacecraft. Efforts to control the fusion has, to this date, been a dismal failure.

Fourth: The Electric Ion Propulsion System. In this type of spacecraft electricity is used to generate ions which, it is said, are deflected against an inert structure at the rear of the spacecraft to produce the forward thrust. The sun is the usual source of the energy to produce the electricity through the use of solar cells. Since the power of the solar cells are weakened as they leave the environment of the solar system, the spacecraft can serve a number of useful purposes in interplanetary flight, but it has no recognized potential for interstellar travel.

Fifth: Uncontrolled Bombs for Nuclear Propulsion. The uncontrolled explosion of nuclear bombs has not yet been put to any serious test, and there is no exact criterion for evaluation of its usefulness.

Sixth: The Fission Ramjet: The interstellar Ram Jet invented by Robert Bussard in 1960 was hoped to be unincumbered with the massive volume of fuel usually contemplated for spaceships destined for flights into the remote distance. He has planned that hydrogen would be scooped up from space, and that fusion in a reactor would provide it with the necessary acceleration. Whether the scoop will work is seriously questioned because of the existence of Pascal's hydrostatic paradox. The scoop is shaped like a horn. Its larger frontal opening has a diameter much greater than the diameter of the rear opening, yet the flow of hydrogen through each opening should remain about equal. So there would be no appreciable advantage gained by the shape of the enormous scoop. It is not expected that this apparatus will find much success in the foreseeable future.

Seventh: Laser Beams to Push Sails on Spaceships. Scientists and engineers are now conducting experiments by focusing laser beams on vast sails of light durable materials. Some of the sails are six hundred miles in length. The pressure of the laser beams against the sails are expected to accelerate the craft to half the speed of light. These are ambitious efforts and there are many skeptics about its chances of success.

SUMMARY OF THE INVENTION

A spaceship is provided with the unique innovation of one or more propellers rotated freely on a shaft through the front of the ship without any machine, motor or engine, but by the force of the space resistance encountered by the pitch of the propeller blades which perform a number of important functions without consuming fuel supplied by earth, including the increase in the ship's velocity, the compression of space particles such as hydrogen, oxygen and other elements into tanks with one-way valves to be transformed through conventional means into gases which are accumulated for jet propulsion fuel to provide continuous acceleration during flight, and to operate a generator to provide electricity and avoid the need to carry on board the inconceivable amount of fuel which would otherwise be required in order to reach its destination, after launching rockets have sent the spaceship beyond the escape velocity and have been jettisoned. The high momentum attained by the ship overcomes the resistance of the various space particles which impact against the propeller. This continuous resistance already initiated by the energy of the released rockets is the source of the energy which rotates the propeller, which deflects the advancing particles, which in turn push the other particles of resistance out of the space in front of the ship, thereby increasing the velocity of the ship without consuming extra fuel since the momentum of the ship would have been achieved previously; after the rockets are jettisoned the only forces accelerating the space ship include the difference between the greater force of the radiations pushing against the rear and the weaker force of the radiations pushing its front as the ship speeds forward; the front of the ship being coated with a smooth light colored finish to deflect particles while the rear of the ship is coated with a black covering to absorb the radiated particles from the rear in order to provide an additional thrust from the rear; the resistance of the radiated particles in rarified space provide sufficient force to turn the propeller blades fast enough to reduce the resistance of space and thereby to accelerate the ship because the ship is traveling at a much greater velocity in outer space than it travels in the denser atmosphere near the earth's surface going over 25,000 miles per hour instead of 60 miles per hour, consequently the presence of the propeller does not increase the resistance to the flight through space on the contrary the pitch of the blades will deflect space particles since empirical experimental evidence demonstrates that the resistance to the ship's forward flight is actually diminished by more than forty percent, thus having the effect of materially increasing its velocity; the fundamental cosmic principle to the effect that resistance varies directly as the cube of the velocity of a vehicle in flight is of utmost importance, because it gives more power to the rotating blades at the greater speeds; it being of great significance that the storage of enormous quantities of propulsion fuel aboard is not required to accelerate the spacecraft, all energy being supplied by the radiating forces of nature.

PREFERRED EMBODIMENT OF THE INVENTION

Without limiting the scope of the invention, the preferred embodiment of the invention is hereinafter set forth.

The practical operation of this invention is based upon empirical evidence discussed in this application. There are a myriad of popular interpretations for observed natural phenomena, some of which are illusory and ambiguous. No single theory of physics has been able to unify such diverse consideration as gravitational attraction, quantum theory, magnetism, and the dual particle/wave nature of electromagnetic radiation. Without being bound to a particular theory of the principles upon which the invention operates, the following hypotheses are submitted for consideration and explanation for applicant's observations. They can be condoned or rejected by those who are more learned. A hypothesis is defined here as an original or alternate rational interpretation of observed natural phenomena.

Hypothesis I. Gravitational attraction is inimical throughout nature. No force of attraction is manifest in gravity nor in any other field of knowledge. Attraction in its technical mechanical sense is an illusion created by the operation of invisible forces. Gravity is generated by the converging particles radiated from the stars of the galaxies. The force of the divergent rays of particles from the sun is negligible when compared with the converging rays of the infinite array of the surrounding stars.

Hypothesis II. Gravitational radiations penetrate deeply into the masses of celestial bodies, as they are propagated from surrounding stars. The approximate depth of these penetrations has been indirectly measured.

Hypothesis III. As each radiated particle is pushed deeply beneath the surface of the intercepting celestial body, the particle is compressed and stored as energy. Eventually, after reaching their maximum depth of penetration, these particles struggle to expand again and emerge in the opposite direction as new radiations erupting from the surface in the form of minute electrons, photons, gravitons, and other particles. When such new radiations emerge from the volcanic flares on the surface of each star they perpetuate the continuous process of reconverting energy from one star to another in cyclical patterns. Particles are absorbed by stars and celestial bodies and they are expelled by them in the reverse direction. We know for a certainty that space is filled with rays of particles traveling from all directions, and gliding between other particles in close proximity simulating the wave frequencies of light and electricity.

Hypothesis IV. Basically, energy is born of the alternating sequences of compression and expansion, of friction and of pressure.

Hypothesis V. Radiations have the capacity to compress and condense particles into clouds, and to convert them into solid matter.

Hypothesis VI. The present is forever.

Hypothesis VII. The Universe has infinite dimension, with flexible densities and equilibrium. The ebb and flow of fluctuations in the infinite sea of particles presents to the mind the vision of a spectacle which can be intelligently acknowledged but never fathomed.

Hypothesis VIII. Radiations from one galaxy to another keep the galaxies separated.

Hypothesis IX. Minor bodies are defined as those celestial bodies with small enough densities and dimensions to permit the complete passage of all radiations which strike them.

Hypothesis X. Major bodies are defined as those which are of sufficient density and dimensions to completely obstruct at least some of the radiations which strike them.

Hypothesis XI. Masses do not have the capability of transporting themselves in orbit or along linear routes by the imaginary force of an intrinsic attribute called inertia. Extra outside energy is needed to produce the continuation of motion or momentum such as a push, friction, impact or a radiation.

Hypothesis XII. Radiations passing through a body moving in the opposite direction will pass through its mass with a velocity equal to the velocity of the radiated particles plus the velocity of the body. The radiated particles passing through from the rear will have a velocity of the particles minus the velocity of the body. Contrary to expectations the flow of particles passing through from the rear at a slower velocity propel the body onward instead of reducing the speed. The duration of the period of frictional resistance is reduced by the swifter passage from the front. The opposition to the change of motion in space is not occasioned by any inherent quality in the mass which is referred to as inertia. It is instead caused by the resistance encountered by the rapid passage of an artificial satellite through the enormous volume of particles permeating space. This has been amply demonstrated by Edward White, the astronaut, during his Gemini mission, operating a hand controlled gun connected to two tanks of compressed oxygen. A trigger releases small jets of particles to push him in various directions. The maneuvers revealed that definite resistance was encountered by the recoil of the spray against the space considered to be rarified. When he changed his direction or his velocity additional energy was needed . . . not to overcome the fiction of mass inertia, but to overcome the resistance or impedance of approaching particles. Inertia is not the inherent attribute of mass. Instead it is the application of an independent source of energy such as radiations and other forces to overcome the resistance offered by various mediums.

The radiations pushing against the front of a spacecraft exert less force on the spacecraft than the radiations pushing against it from the rear, due in part to the swifter passage of the radiations from the front and the lesser resistance encountered. This is in conformance with principles of engineering. The velocity of the ship is sustained by slower passage of radiations pushing from the rear and thus greater resistance encountered by the radiations, and not by the imaginary force of inertia.

Hypothesis XIII. All minor celestial bodies are composed entirely of inertial mass, because stellar radiations pass completely through them. This simply means that the force of friction caused by the radiations passing through the mass, affect the motion of the spacecraft. The meaning ascribed to the word "inertia" in this application has a different connotation from that given in the conventional texts on physics.

Hypothesis XIV. The non-inertial mass is defined as the mass of a major celestial body which is surrounded by the "inertial shell". (See FIG. 4). The thickness of the inertial shell is the height of the minor arc subtending a chord of a major body which is 1960 miles long, being the maximum depth to which gravitational radiations penetrate below the surface of any major body. The force of a ray of obstructed particles which is moving in one direction within a major body is usually counterbalanced by another ray of obstructed particles which are moving in the opposite direction. The two opposite forces neutralize each other. The great preponderance of mass in most major bodies consist of non-inertial mass. At the present time the entire mass of every major body in the Universe is considered to be inertial mass in the conventional scientific journals. The non-inertial mass is not contemplated in the current texts on physics. According to the authorities the momentum of a body is calculated by multiplying its entire mass by its velocity and by its density. This hypothesis does not conform with such rules. This modification prescribes only that the inertial mass (exclusive of the non-inertial mass) of the body be multiplied by the velocity and the density to obtain a completely different value for the momentum.

Hypothesis XV. Successive conversions of energy are involved in transporting a body from one location to another. Yet the exertion of radiant energy in pushing an orbiting satellite is generally ignored in analyzing the forces engaged in overcoming space resistance. Resistance in rarified space is thought to be negligible.

Hypothesis XVI. It appears doubtful that matter can be transformed into energy. Matter does not vanish. Matter and energy are not interchangeable. Matter can be fractured into smaller components but it can never lose the essence of its existence. Energy is the action affecting the movement or state of matter.

Hypothesis XVII. Electrons do not whirl in orbits around clusters of protons. Neither are they attracted toward the protons. If the protons are of like charge and do repel each other, then they would fly apart. A glue to stick them together would seem to be highly impractical. It appears that the electrons actually travel through the wavy channels between the contiguous spherical protons.

Hypothesis XVIII. Attracting forces are not manifested in any electromagnetic behavior. The only force involved is the force of repulsion. The change of direction in the spin of a spiralling movement of electrons through a conducting coil affects the direction of the flow at the respective poles of a magnet. The direction of the flow of current through the coil establishes the relative positions of the north and the south poles.

It is known that the permanent magnet is formed by sending a current of electrons through a conducting coil surrounding a core of iron. These electrons forge a channel through the core. After the coil is removed from the core then a supply of electrons from the surrounding atmosphere ar spontaneously pressed into the channels as replacement for the electrons previously supplied by the coil. A permanent magnet is thus formed immediately and begins to function automatically. When the positive pole of one is aligned in close proximity to the positive pole of the other magnet, the flow of electrons from the two poles collide, resulting in a repulsion. When similar poles adjoin each other, the electrons are either leaving or entering each pair. In either case there is interference with the flow, and repulsion occurs again.

When the negative pole is placed near the positive pole then the flow of electrons in each magnet is in the same direction, and each pole behaves in conformance with normal mechanistic principle, pressing the slanted channels of each magnet against the channels of the other.

The implication of this is that the concept of gravity, likewise, is a force in the form of a push, and it is this concept which helps to unravel the secrets leading to successful transportation in remote space.

Hypothesis XIX. The depth to which gravitational radiations penetrate major celestial bodies has been calculated to be about 1960 miles.

Hypothesis XX. As previously indicated the sphere of obstruction represents the volume of matter, in a major body, which is not affected by momentum, and is referred to as the non-inertial mass. Such matter does not display any of the attributes associated with inertia such as the opposition to any change in motion. This phenomena is caused by the fact that, for all practical purposes, every radiation moving in any direction, obstructed by the major body, there is another radiation moving in the opposite direction which is also obstructed and which neutralizes the first. This explains why scientists are led to believe that the larger celestial bodies have so much less density than the earth.

The weight of a man on the surface of earth will be almost the same as his weight on the surface of Jupiter because there is a limit to the radiated gravitational push from overhead, in spite of the fact that at greater distances above Jupiter the gravitational push toward the surface is many times greater than it is at the same distance above earth.

Hypothesis XXI. Large major bodies float in space as hollow balloons. This explains why Sirius B is reputed to have a density which is 75,000 times greater than Sirius A.

Hypothesis XXII. The gravitational constant which is based upon the delicate movements of the Cavendish balance cannot be relied upon. If the heavy metal Cavendish balls are moved toward each other, then it is apparent that they are pushed toward each other by the radiations moving from the opposite directions. If anyone is in doubt about the dip which a jet plane makes while travelling over massive deposits of metal ore, then it must be realized that this is attributable to the obstructions of radiations from an angle below. No pull is involved.

Hypothesis XXIII. The force of resistance to the front of a body moving through space is proportional to the cube of its velocity. The force of propulsion acting on the spaceship is also proportional to the cube of the velocity.

Hypothesis XXIV. Radiations from the stars from the remote regions of the Universe merge with, combine with and are reinforced by other radiations from closer stars.

Hypothesis XXV. It might not seem that the resistance in remote space is comparable along the earth's surface, but the spaceships are so much faster it can be easily appreciated why the resistance in space can be such a significant factor. The great speed in space multiplies the value of this resistance.

Hypothesis XXVI. The regular increase and decrease in the sun's semi-diameter at the new moon and the full moon alternately strengthens the resolve to vigorously investigate the validity of the conviction that attraction is but an illusion.

At the outset of this study it became apparent that there was a much greater proportion of non-inertial mass within the earth than within the moon. If this proved to be true then the orbit of the earth around the earth-moon center of revolution would necessarily be much greater than it was thought to be by the most competent scholars and scientists. The moment-of-force around its center of revolution should be equal to that of the earth around the same center of revolution. Each moment of force would be found by multiplying the volume of the inertial shell by its distance from its center. The inertial shell of a major celestial body is the inertial material surrounding the non-inertial material of that body. Since the average distance between the earth and the moon is about 240,000 miles, since the inertial shell of the earth contains approximately 23,766,000,000 cubic miles of mass, and since the inertial shell of the moon contains about 4,892,000,000 cubic miles of mass therefore:

$$4,892,000,000 \times (240,000 - y) = 23,766,000,000 \times y$$

where "y" represents the distance of the earth from its center of revolution amounting to 44,556 miles, while the average distance of the moon from its center of revolution amount to only 199,042 miles.

By contrast Newton's law shows that the center of mass (center of revolution) for the earth-moon system is only 2,900 miles from the center of the earth, and an average distance of 238,000 miles from the center of the moon.

It is obvious if these newly calculated orbits of the earth and the moon can be officially verified, then it would show quite conclusively that gravitational push does indeed radiate from the stars in the heavens.

The increase in the semi-diameter of the sun, from new moon to full moon is approximately 1.00" as a result of the earth-moon spiralling revolution around each other. The decrease from full moon to new moon also amounts to 1.00".

The average in the semi-diameter of the sun during each two week period of the earth's orbit around the sun from perihelion to aphelion amounts to approximately 5.33". These increases in the semi-diameters during the solar orbit are cumulative. The increases and decreases of the earth-lunar orbits around each other are alternately offset.

A careful study of the meticulous tables in the annual Astronomical Almanacs prove quite conclusively that the semi-diameters of the sun alternately increase and decrease by an angle of approximately 0°1'00" at the full moon and at the new moon, as a result of the spiralling of the earth-lunar revolution, although the observations of the published semi-diameters were based on predictions and adjustments made over a year in advance.

It must be noted that the readings of the tables in the Almanac represent the combined effects of the earth's orbit around the sun, and its orbit around the moon simultaneously. The semi-diameter resulting from the earth-lunar revolution is accordingly mingled with the semi-diameter caused by the earth's annual orbit around the sun. The process of separating and identifying the variations attributable to the earth-moon system from the variations attributable to the earth's sun orbit, is quite intricate.

Each tabulation in the column of semi-diameters of the Almanac must be analyzed in the context of the variations observed along the entire solar orbit. At certain points the semi-diameters associated with the solar orbit are increasing while the semi-diameters associated with the earth-lunar revolution are decreasing. At other points the semi-diameters resulting from the solar orbit will increase while those resulting from the earth-lunar revolution are decreasing. At other points the semi-diameters resulting from the solar orbit will decrease while those resulting from the earth-lunar revolution will also decrease. The patterns of reversals in the variations in the published tabulations become complicated. In addition the rate of change in the variations of the semi-diameter must be taken into account.

If the spiralling orbit of the earth around the moon did not have a diameter of 90,000 miles, there would be no valid explanation for the unusual and erratic path of the earth around the sun. If the earth-lunar orbit were only 2,900 miles, as contended on the basis of current assumptions, then the path of the earth along the solar orbit would be relatively smooth. The attempt to rationalize the earth's spontaneous swerving by postulating the influence of imaginary nutations and comparing it to the nodding of a spinning top has not been satisfactorily vindicated. It is important that we correct these illusions so that we can focus on truth about the nature of the cosmos, and concentrate on a viable plan to harness the radiations throughout space which will enable us to reach the stars intact.

Figure 1:
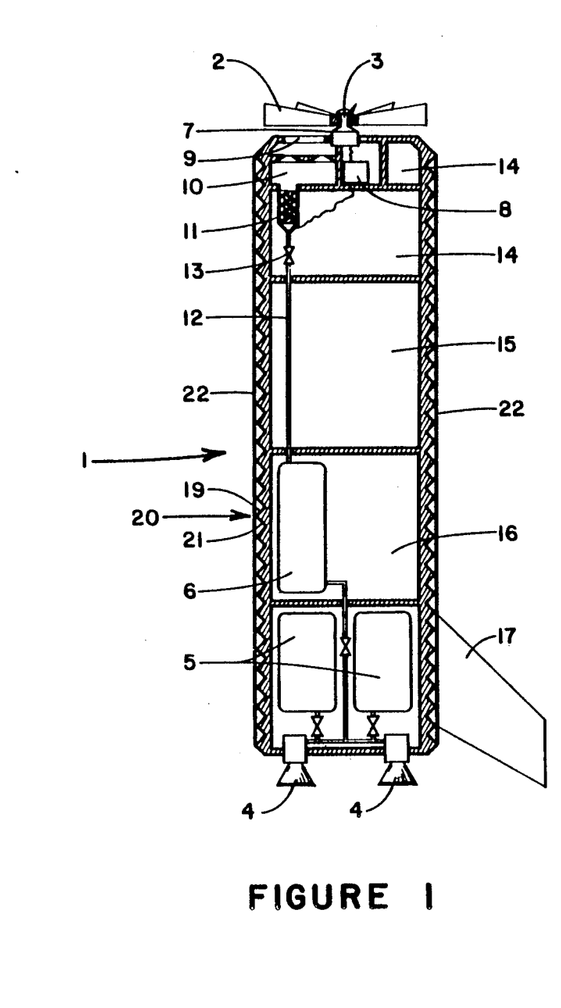

In FIG. 1 item (1) the special spaceship is launched into space from the earth's surface or from a space station after being assembled. Rockets used for providing the initial thrust to start the habitat on its journey toward the stars are not shown in detail in the drawing because they are not an original part of the invention and are well known.

The high initial velocity of the spaceship as it starts to travel along its trajectory is accelerated forward by several notable sources of energy.

(a) The gravitational radiations pushing from the rear of the spacecraft encounter greater resistance than the radiations pushing against the spacecraft from the front. The difference in the resistance encountered by the front and the rear radiations being caused by the forward movement of the spaceship. The force of energy is generally confused with the force of inertia, but inertia is not an intrinsic attribute of matter and does not have the power of continuing a body in motion after it has been started in motion. The velocity of this habitat will normally be reduced by both the resistance of space particles from the front and by the negative force of the gravitations obstructed by the earth from the rear.

(b) The pressure of resistance of the radiations moving against the propeller from the front, is exerted against the front of the blades causing them to rotate rapidly. Some of this pressure of resistance is absorbed by the spacecraft itself, causing it to lose a small amount of energy. The smaller particles pass through the blades, while the larger particles, such as cosmic rays, are deflected against the approaching radiations travelling from the front, thrusting a great amount of them out of the path of the accelerating spaceship thus reducing the resistance to the ship which in turn increases its velocity. The pitch of the rear side of the propeller throws space particles towards the rear and thereby pulls the ship forward slightly.

Empiracle tests demonstrates that the propeller rotating freely about a shaft reduces the resistance to the forward progress of the spacecraft by the enormous amount of forty percent. That is a tremendous reduction in the resistance representing all of the energy, momentum and acceleration contributing to the velocity of the ship which has no technically determined limit. This forty percent decrease in resistance automatically increases the ship's velocity. The propeller is rotated by the impact of the approaching particles in space. No additional fuel is needed to turn the propeller. If there were no rotating propeller in front of the habitat, the front of the ship encounters the maximum resistance from the advancing particles in front. The velocity would not be increased by placing any type of shield or a stationary propeller in front of the ship. However, the presence of a rotating propeller in front of the ship would not increase the resistance of the ship, but paradoxically would have the effect of drastically reducing the resistance. This reduction in the resistance will have the effect of increasing the velocity of the ship.

Such freely rotating propellers without gears or mechanical connection to airplane motors or to jet engines, will prove to be an economical advantage when affixed to the front of any aircraft such as commercial jets. The purpose will be to reduce resistance and thereby increase velocity. Such a propeller would also serve as a free source of harnessed space particles in auxiliary fuel for jet propulsion in transit.

FIG. 1 is a cross section of spacecraft 1 having propeller 2 mounted on shaft 3 on its front end. It is believed that the blades of propeller 2 having a pitch of 30°–45° will be appropriate. Rocket engines 4 are mounted at the rear end of spaceship 1. Fuel tanks 5 and auxiliary fuel tank 6 supply fuel to engines 4.

Generator 7 is positioned on shaft 3 and turns with propeller 2 to generate electricity during flight. Electric power is stored in batteries 8. Power from batteries 8 is used to operate the life support system of spacecraft 1.

Figure 3:
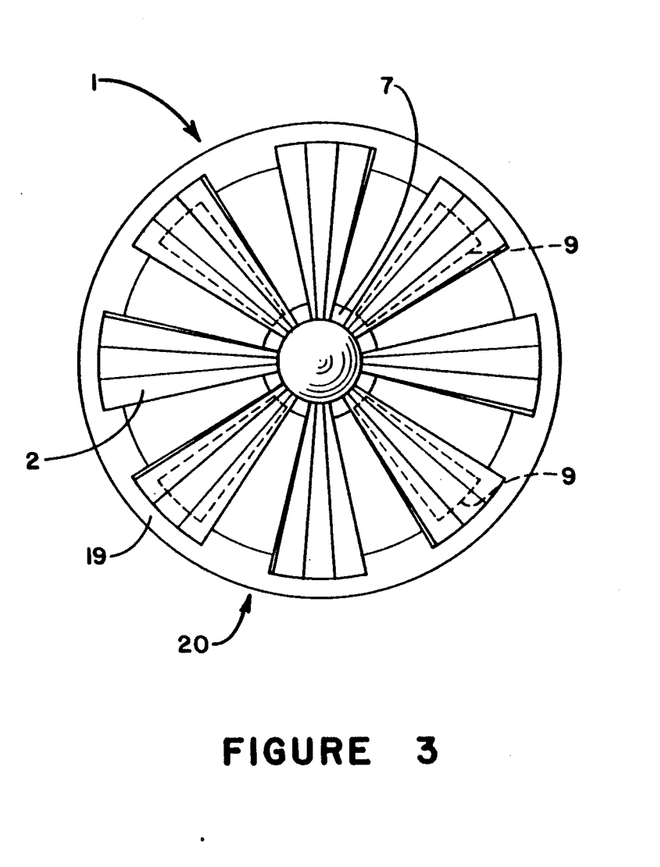

Hydrogen, electrons, oxygen and other space particles encountered in space flight enter intake ports 9 located behind propellers 2 as shown in FIGS. 1 and 3. The incoming matter enters duct 10 and is drawn into compressor 11 also powered by batteries 8. Compressed matter is directed through line 12 and one way valve 13 and into auxiliary fuel tank 6 where it is stored until needed for fuel.

Spaceship 1 is further provided with compartments 14, 15 and 16 for the pilot, crew and equipment respectively. Rudder 17 shown in FIG. 1 and control wings 18 shown in FIG. 2 add stability and maneuverability in flight.

It is important for us to note that the empirical cosmic principle stipulating that the space resistance of a vehicle varies as the cube of its velocity thereby giving more power to the blades of the propeller, thus averting the need to store on board enormous quantities of fuel propellants manufactured on the earth's surface. All fuel needed to continue the flight of the spaceship is supplied by harnessing the particles radiated by nature.

Figure 2:
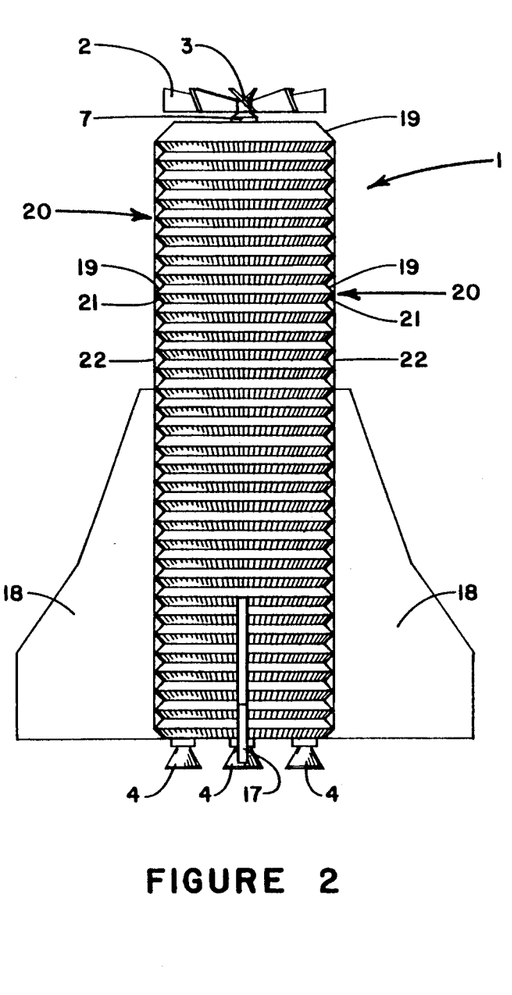

As part of the invention a smooth white seal should be painted over the front of spaceship 1 using a material which reflects radiations; over the front of the rotating blades of propeller 2 and over the front side 19 of the ridges 20 encircling the outer surface of the space ship as illustrated in FIG. 2, to deflect space particles. A black coating should be applied to the rear side 21 of ridges 20 and to the rear of the ship, to absorb the force of the radiations from the rear thus adding to the forward thrust. An example of suitable coatings are those used in radiometers to detect radiant energy. The substitution of other materials for creating radiation reflecting and absorbing surfaces may be made without deviating from the spirit of the invention.

In a preferred embodiment, the front side 19 and rear side 21 of ridges 20 are angled at 45° from the vertical.

Together front side 19 and rear side 21 form an angle of approximately 90°.

Referring to FIG. 2, transparent panels 22 are placed over ridges 20 to reduce space resistance. Those with skill in the art may select a suitable material for transparent panels 22 based upon the materials ability to transmit the desired spectrum of radiation and protect the outside of the spacecraft. It is believed that the material used for aircraft windshields is appropriate for use.

FIG. 3 shows the top view (from above) of the spaceship 1 with ridges 20 which provide additional thrust forward. Intake ports 9 extend radially from the center of spaceship 1.

Figure 4:
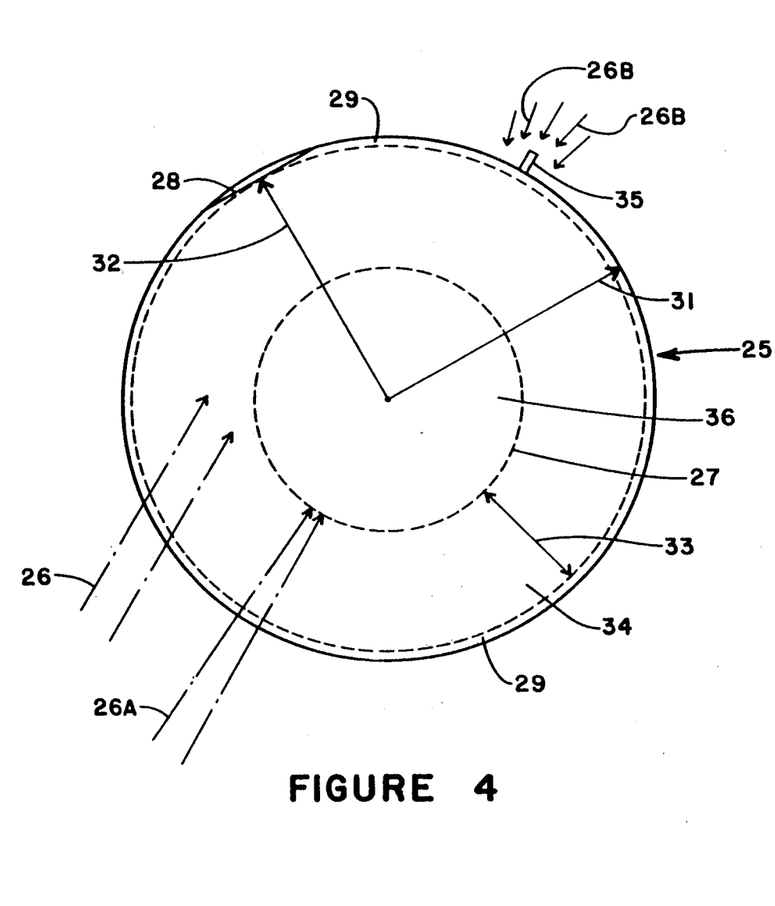

FIG. 4 illustrates the nature of gravitational push, in contrast with the assumption of gravitational attraction. It demonstrates the manner in which matter interacts with the particles radiated through the infinite Universe, and serve to explain the forces on which this invention is dependent.

The earth, as a major body, is represented by 25. Radiations 26A have been determined through geometric analysis, to penetrate (from space), approximately to a depth of 1960 miles beneath the earth's surface to the imaginary sphere of no-gravity 27. The force of gravitational radiations denoted generally as 26 do not reach below 1960 miles. The chord of passage 28 is the maximum distance through which radiations 26 pass while passing through the inertial shell 29 surrounding the sphere of obstruction 30 which consists entirely of non-inertial mass, since radiations 26, which enter the sphere of obstruction do not emerge beyond it and do not contribute in any way to the motion of any major body. For every radiation 26 entering the sphere of obstruction 30 there is an equal and opposite radiation entering which counterbalances and neutralizes it, according to quantum physics. Number 31 represents the radius of the earth and number 32 is the radius of the sphere of obstruction 30. Number 26 indicates radiations from any direction which penetrates the sphere of obstruction. The features of this illustration are conceived on the basis of cosmological principles affecting major bodies. Number 33 designates the width of inertial ring 34 defined as the inertial mass surrounding a major body having a base 1960 miles wide beneath the arc containing a great circle of that major body. The ratio of the non-inertial mass 36 to the inertial mass is much greater in a larger major body than in a smaller one.

Object 35 on earth's surface is pushed toward the earth's center by the force of the friction with the radiations 26B which passing through it, while the radiations 26A converging from the opposite side of the globe are obstructed. Accordingly, the frictional push from the radiations flowing from above the object represent the force of a gravitational push and not the force of a gravitational attraction!

This diagram is important because it illustrates the forces which sustain the momentum and the acceleration of the space habitat after it has been launched into flight by the initial thrust of the jet rockets. The radiations from behind the spaceship continuously impels it forward because the ship has its momentum moving forward.

It also provides a practical system of mathematics for deriving convenient equations for predicting the true relationships of the important factors of momentum, force, density, velocity and distance which are so important in accurate space study. This new concept of mathematics can be briefly illustrated in the following paragraph:

The factor of inertia can now be recognized to be proportionate to the mass of the inertial shell shown in FIG. 4, and not in proportion to the entire mass of the celestial body. Accordingly, all large major bodies float in space like hollow spheres. The non-inertial mass 36 within such bodies does not affect the increase or the decrease in velocity. The main cosmic forces affecting a change in momentum are space resistance and the force of radiations. Momentum and acceleration are proportionate to the cubic miles of the inertial shell of a major body (at its relative density,) and not to the mass of the entire body.

EXAMPLES

Figure 5:
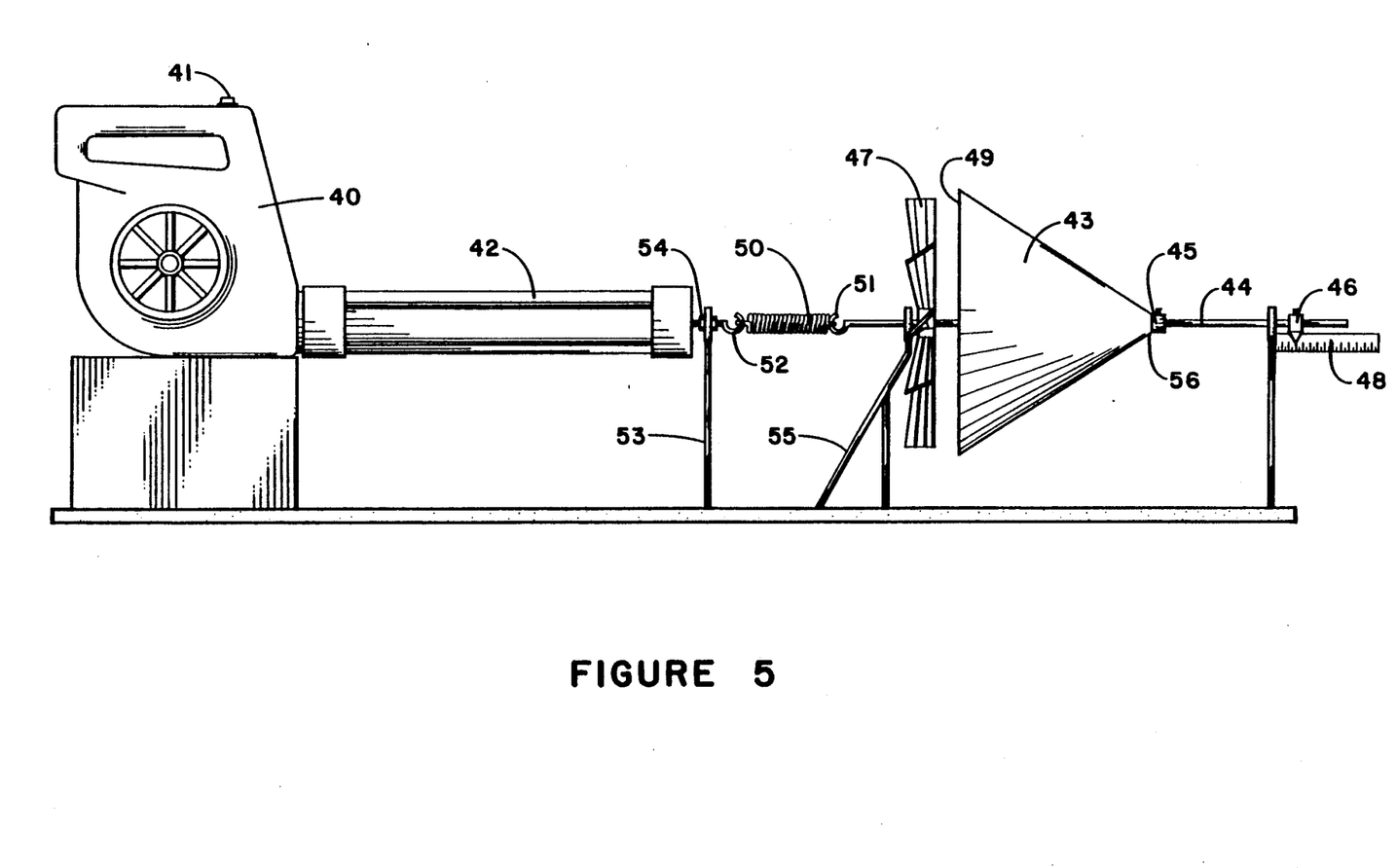

FIG. 5 shows a testing apparatus to demonstrate the phenomena of converting the energy of space resistance to the energy of increasing velocity by installing a freely rotating propeller in front of a space ship or a jet plane.

This figure shows a centrifugal blower 40, controlled by an electric switch 41 generating a current of air having a calibrated velocity of one hundred miles an hour, through a plastic tube 42 against the base of a cone-shaped compartment 43 tightened rigidly around shaft 44 by means of clutch-stop 45. Marker 46 with pointer measures the force of the air pressure, and is also tightened around shaft 44. When the centrifugal blower 40 blows air against propeller 47 which rotates freely around shaft 44 and against cone-compartment 43, marker 46 is moved along top edge of ruler-scale 48 to measure the pressure of the air current blowing through tube 42. The current of air rotates propeller 47 and pushes against base 49 of cone-compartment and shaft 44 thus stretching spring 50, because the shaft 44 is connected to spring 50 by means of hook 51, and the opposite end of spring is connected to hook 52 which is stabilized by brace 53 and by adjustable bolt 54. Cone-compartment 43 is stabilized with shaft 44 by means of brace 55. Shaft 44 does not turn, rather it slides back and forth.

After the air current is switched off the marker will return to its original position by the tension of contraction in spring 50. Braces 53 and 55 support and stabilize shaft 44, cone 43, and propeller 47.

This seemingly inconsequential feature is of amazing importance in the development of interstellar transportation. Note that the cone-compartment 43 simulates our space habitat, and the air current blown by blower 40 represents the resistance of space particles to the movement of cone 43 propelled along its forward motion by the independent force of radiated particles in space. This testing apparatus reveals that the freely rotating propeller converts the energy of space resistance into a reduced resistance to the forward thrust of base 49 of cone 43 and thereby increases the cone's velocity since resistance to that velocity is lessened.

The conditions for operating the spaceship near the earth's surface in a denser atmosphere at a greatly reduced speed are shown to be favorably compared to conditions for operating in remote space in a rarified environment at a much greater velocity. The conditions are favorable for making use of the energy provided by the radiated particles and by the increased energy contributed by the increased velocity (in outer space) creating a considerable force which varies as the cube of that velocity.

This experiment shows that the presence of the propeller in front of the base of the cone reduces the resistance of the air current even while the cone is pushed in the denser atmosphere near the earth's surface without consuming any additional artificial fuel. The energy reducing the resistance does not result from any magic of the invention. That energy is merely transformed from radiated particles. This merely demonstrates the principle that the presence of a freely rotating propeller can increase the velocity of a spaceship by converting the energy of space particles to a reduction in space resistance which in turn increases the velocity of the ship without consuming fuel.

FIG. 5 is not intended to literally depict the features of the invention. It is presented here simply to facilitate the awareness that the presence of the freely rotating propeller does not diminish the momentum of the spacecraft. The frictional energy from the radiated particles impinging upon the propeller blades from the front merely capture or harness the energy of resistance which otherwise would have been wasted. The energy thus converted to the reduction of resistance, and the increase of velocity could also be dedicated to other purposes.

The resistance of the air current to the various features of the cone is measured by the distance the pointer or marker 46 moves along the scale 48. It was necessary to maintain a record of the resistance by exposing each part of the cone to the current of air in separate successive readings in order to compare and evaluate the operation of the testing equipment. Accordingly, the force of resistance shown on scale 48 was recorded for the apex 56 of cone 43 by pointing the apex toward the air current being blown through tube 42. In like manner the resistance of air current to the base 49 of cone 43 was measured. The resistance to the propeller operating alone was then measured. The resistance to the propeller operating in front of base 49 and the resistance to the propeller operating in front of apex 56 of cone 43 were each recorded in separate readings.

These successive readings revealed that the greatest reduction in resistance corresponded with the pressure of the air current directed against the propeller in front of the base 49 of cone 43. This reduction in resistance of current demonstrated that the implied velocity of the cone 43 could be increased by 40 percent merely by placing a freely revolving propeller in front. This means, by simulation, that by installing the propeller in front of the spaceship its velocity could be increased by forty percent. In addition, space particles can be compressed and harnessed for supplementary fuel because the radiations supplying this energy is constantly available and renewable.

The velocity of the air current from centrifugal blower 40 in FIG. 5 is 100 miles per hour. The shaft 44 supports cone 43 and propeller 47. The clutch lock 45 is tightened around the shaft 44 behind the base or the apex of cone 43, and marker 46 is tightened around same shaft as a pointer for scale 48. By pushing the cone 43 and or propeller 47 with the current of air toward the right, the spring 50 is stretched; and by turning the turbine switch off the tension in the spring 50 is released, and the shaft with the marker 46 is moved toward their original positions toward the left. The measuring scale is subdivided into equal units of measurement. The adjustable marker 46 is initially set near the rear end of shaft to provide the visible means of measuring the distance the marker 46 is moved along scale 48.

| CHART OF REDUCTIONS IN SPACE RESISTANCE CAUSED BY PROPELLER | |
|---|---|
| Part Affected-Facing Current of Air | Resistance |
| (1) Propeller alone | 2/32" |
| (2) Cone Base alone | 8/32" |
| (3) Cone Apex alone | 1/32" |
| (4) Cone Base with propeller in front | 6/32" |
| (5) Cone Apex with propeller in front | 2/32" |
| (6) Cone Base with propeller behind base | 8/32" |
| (7) Cone Base with two propeller in front | 5/32" |
| (8) Cone Base one propeller in front, one behind | 6/32" |
| (9) Cone Apex with two propellers in front | 1/32" |
| (10) Cone Apex with propeller behind base | 2/32" |

The relationship between resistance and velocity should not be limited to the study of a conical compartment as in FIG. 5. The paramount shape to be considered is the cylindrical habitat shown in FIG. 1-3. It can be deduced from the chart above that the cosmic radiations would be operating to the maximum advantage with the rear area of the spaceship equal to the front area as in FIG. 1. It appears evident that the cylindrical form will be best adapted to interstellar missions and to airplanes or jets. Only when three propellers rotate in front of the spaceship as listed in the chart above, can the full advantage of the invention be gained.

ANALYSIS

The current of air represents the force of resistance blowing against the respective features of the cone and of the propeller. This force is measured by the movement of the pointer along the top of the scale which is divided into units of 1/16". By analogy this force is proportional to the total thrust of the powerful jet engines pushing spacecraft through the skies with hundreds of tons of pressure. In order to relate the force of resistance measured by the scale on this testing apparatus to the force of resistance encountered by the spaceship it is necessary to first measure the resistance of the base of the cone, and then the resistance of the apex of the cone, then recording the resistances observed separately with propeller absent. Next, the resistance of the base, and of the apex separately, must be measured with the propeller rotating freely in front. By subtracting the resistance to the base while the propeller is operating to the resistance to the base while the propeller is removed, we get the reduction of resistance caused by the presence of the rotating propeller. The same is true concerning the reduction to the apex of the cone, if any.

To illustrate, the resistance to the base alone in test 2 is 8/32", while in test 5 with one propeller operating in front the resistance is 6/32". In test 7 with two propellers rotating in front of base the resistance is 5/32". This 5/32" is the equivalent of a reduction of 5/32" or to 40 percent of the total resistance when the propeller is not utilized. The validity of this phenomena can be confirmed immediately by installing a freely rotating propeller in front of plane! In addition to aircraft operating within the earth's atmosphere, a freely rotating propeller positioned on the front of a land vehicle such as an automobile or train, will reduce resistance significantly. Likewise, the propeller may be installed on the front of a submarine.

There are, of course, many alternate embodiments and modifications which are intended to be included within the scope of the following claims.

What I claim is:

1. A craft for flight in the atmosphere or space, comprising a cylindrical body having a front end and a rear end, propulsion means positioned in said rear end, and a propeller mounted about a shaft extending from said front end, said propeller being rotatable about and independent of said shaft.

2. A craft according to claim 2 wherein said cylindrical body further comprises a plurality of annular ridges spaced on an outer side of said body, each of said ridges having a front side with a radiation reflective coating and a rear side with a radiation absorbing coating.

3. A craft according to claim 3 wherein a portion of said body comprising said annular ridges is covered by a transparent panel having a smooth outer surface corresponding to a curvature of said cylindrical body.

4. A craft according to claim 2 wherein said front end of said cylindrical body is substantially perpendicular to an axis of said cylindrical body.

5. A craft according to claim 1 wherein said propeller has a diameter substantially equal to a diameter of said body.

6. A craft according to claim 1 wherein said front and rear ends being substantially flat and parallel to one another.

7. A craft for flight in the atmosphere or space, comprising a cylindrical body having a front end and a rear end, a jet propulsion means positioned in said rear end and plurality, of annular ridges spaced along an outer side of said body, each of said ridges having a front side with a radiation reflective coating and a rear side with a radiation absorbing coating.

8. A craft according to claim 7 wherein said rear end of said body has a radiation absorbing coating and said front end of said body has a radiation reflective coating.

9. A craft according to claim 8 further comprising a shaft having a first end connected to said front end of said body and a second end extending out said front end, said second end of said shaft having a propeller engaged therewith, an electrical generator engaging positioned surrounding said shaft and engaged therewith whereby rotation of said propeller drives said generator.

10. A craft according to claim 9, wherein said front end of said cylindrical body is substantially perpendicular to an axis of said cylindrical body.

11. A craft according to claim 10 further comprising a compressor positioned in said interior of said body, an electrical energy storage system positioned in said interior of said body and connected to said generator, means connecting said compressor and said energy storage system to drive said compressors, an intake duct between an opening in said front end and said compressor and a storage tank positioned in said body for accumulation of compressed matter.

12. A craft according to claim 11 further comprising means to supply said compressed matter as fuel for said jet propulsion means.

* * * * *